United States Patent
Yamada et al.

(10) Patent No.: US 8,351,182 B2
(45) Date of Patent: Jan. 8, 2013

(54) ELECTRIC DOUBLE LAYER CAPACITOR

(75) Inventors: Chiho Yamada, Osaka (JP); Eri Hirose, Kyoto (JP); Yoshinori Takamuku, Kyoto (JP); Hideki Shimamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 979 days.

(21) Appl. No.: 11/994,068

(22) PCT Filed: Aug. 7, 2006

(86) PCT No.: PCT/JP2006/315573
§ 371 (c)(1),
(2), (4) Date: Dec. 27, 2007

(87) PCT Pub. No.: WO2007/023664
PCT Pub. Date: Mar. 1, 2007

(65) Prior Publication Data
US 2009/0231781 A1    Sep. 17, 2009

(30) Foreign Application Priority Data
Aug. 26, 2005  (JP) ................................. 2005-245608
Feb. 10, 2006  (JP) ................................. 2006-033373

(51) Int. Cl.
*H01G 9/00* (2006.01)
(52) U.S. Cl. ...................................................... 361/502
(58) Field of Classification Search .................... 361/502
See application file for complete search history.

(56) References Cited

U.S. PATENT DOCUMENTS

| | | | | |
|---|---|---|---|---|
| 4,737,889 A * | 4/1988 | Nishino et al. | ................ | 361/502 |
| 5,381,303 A * | 1/1995 | Yoshida et al. | ................ | 361/502 |
| 6,585,915 B2 | 7/2003 | Shinozaki et al. | | |
| 6,702,963 B2 * | 3/2004 | Kibi et al. | ..................... | 264/29.6 |
| 6,741,450 B2 * | 5/2004 | Nakazawa et al. | ............ | 361/502 |
| 6,865,068 B1 * | 3/2005 | Murakami et al. | ............ | 361/502 |
| 2004/0160728 A1 * | 8/2004 | Oyama et al. | .................. | 361/502 |
| 2006/0139846 A1 * | 6/2006 | Mori et al. | ..................... | 361/272 |

FOREIGN PATENT DOCUMENTS

| | | |
|---|---|---|
| JP | 06-056827 | 7/1994 |
| JP | 6-56827 | 7/1994 |
| JP | 11-054376 | 2/1999 |
| JP | 11-054379 | 2/1999 |
| JP | 2000-169129 | 6/2000 |
| JP | 2001-284188 | 10/2001 |
| JP | 2004-111719 | 4/2004 |
| JP | 2005-116855 | 4/2005 |

* cited by examiner

*Primary Examiner* — David M Sinclair
(74) *Attorney, Agent, or Firm* — McDermott Will & Emery LLP

(57) ABSTRACT

An electric double layer capacitor includes a first collector, a first polarizable electrode layer provided on the first collector, a second collector, a second polarizable electrode layer provided on the second collector and facing the first polarizable electrode layer, a separator having an insulating property and provided between the first polarizable electrode layer and the second polarizable electrode layer, and a driving electrolyte impregnated in the first polarizable electrode layer and the second polarizable electrode layer. The polarizable electrode layers mainly contain activated carbon made from phenol resin, have a surface roughness not larger than 0.6 μm, and have an electrode density ranging from 0.5 g/cm$^3$ to 0.7 g/cm$^3$. This electric double layer capacitor has characteristics deteriorating little even at low temperatures, thus having a reliability for a long time.

8 Claims, 10 Drawing Sheets

FIG. 4

| | Amount of Acidic Surface Functional Group (mEq/g) | Solvent | Electrolyte | |
|---|---|---|---|---|
| | | | Cation | Anion |
| Example 1 | 0.31 | Propylene Carbonate | 1,3-Dimethylimidazolium | $BF_4^-$ |
| Example 2 | 0.37 | Propylene Carbonate | 1,3-Dimethylimidazolium | $BF_4^-$ |
| Example 3 | 0.50 | Propylene Carbonate | 1,3-Dimethylimidazolium | $BF_4^-$ |
| Comparative Example 1 | 0.21 | Propylene Carbonate | Tetraethylammonium | $BF_4^-$ |
| Comparative Example 2 | 0.31 | Propylene Carbonate | Tetraethylammonium | $BF_4^-$ |
| Comparative Example 3 | 0.37 | Propylene Carbonate | Tetraethylammonium | $BF_4^-$ |
| Comparative Example 4 | 0.50 | Propylene Carbonate | Tetraethylammonium | $BF_4^-$ |
| Comparative Example 5 | 0.83 | Propylene Carbonate | Tetraethylammonium | $BF_4^-$ |
| Comparative Example 6 | 0.21 | Propylene Carbonate | 1,3-Dimethylimidazolium | $BF_4^-$ |
| Comparative Example 7 | 0.83 | Propylene Carbonate | 1,3-Dimethylimidazolium | $BF_4^-$ |

FIG. 5

| | Amount of Acidic Surface Functional Group (mEq/g) | Initial Value | | After 1000 hrs | | Change Rate from Initial Value | |
|---|---|---|---|---|---|---|---|
| | | Capacitance (F/cm³) | Resistance (mΩ) | Capacitance (F/cm³) | Resistance (mΩ) | Capacitance (%) | Resistance (Times) |
| Example 1 | 0.31 | 24.2 | 14.5 | 22.8 | 15.0 | -10.0 | 1.04 |
| Example 2 | 0.37 | 24.5 | 14.9 | 22.0 | 15.0 | -10.1 | 1.05 |
| Example 3 | 0.50 | 24.9 | 16.2 | 21.6 | 18.1 | -13.4 | 1.12 |
| Comparative Example 1 | 0.21 | 18.2 | 22.4 | 15.1 | 24.7 | -18.1 | 1.10 |
| Comparative Example 2 | 0.31 | 21.5 | 23.0 | 16.8 | 26.5 | -20.0 | 1.15 |
| Comparative Example 3 | 0.37 | 22.0 | 25.0 | 17.6 | 28.7 | -20.0 | 1.15 |
| Comparative Example 4 | 0.50 | 22.7 | 26.3 | 17.7 | 30.2 | -22.0 | 1.15 |
| Comparative Example 5 | 0.83 | 23.5 | 29.2 | 17.2 | 35.4 | -27.9 | 1.20 |
| Comparative Example 6 | 0.21 | 20.5 | 13.0 | 17.8 | 13.1 | -9.0 | 1.01 |
| Comparative Example 7 | 0.83 | 25.5 | 18.1 | 21.1 | 20.8 | -17.3 | 1.15 |

FIG. 6

| | Amount of Acidic Surface Functional Group (mEq/g) | Initial Value | | After 1000 hrs | | Change Rate from Initial Value | |
|---|---|---|---|---|---|---|---|
| | | Capacitance (F/cm³) | Resistance (mΩ) | Capacitance (F/cm³) | Resistance (mΩ) | Capacitance (%) | Resistance (Times) |
| Example 1 | 0.31 | 24.0 | 65.2 | 21.1 | 71.7 | -12.2 | 1.10 |
| Example 2 | 0.37 | 24.4 | 68.6 | 21.1 | 82.3 | -13.4 | 1.20 |
| Example 3 | 0.50 | 23.5 | 73.5 | 19.6 | 94.8 | -16.4 | 1.29 |
| Comparative Example 1 | 0.21 | 16.7 | 98.0 | 14.3 | 104 | -14.4 | 1.06 |
| Comparative Example 2 | 0.31 | 21.5 | 104 | 16.9 | 125 | -21.4 | 1.20 |
| Comparative Example 3 | 0.37 | 22.1 | 109 | 17.2 | 140 | -22.8 | 1.29 |
| Comparative Example 4 | 0.50 | 21.2 | 132 | 16.5 | 178 | -22.2 | 1.35 |
| Comparative Example 5 | 0.83 | 21.0 | 165 | 15.1 | 247 | -28.1 | 1.50 |
| Comparative Example 6 | 0.21 | 18.6 | 61.5 | 16.7 | 64.6 | -10.0 | 1.05 |
| Comparative Example 7 | 0.83 | 23.2 | 87.2 | 18.2 | 126.4 | -21.4 | 1.45 |

FIG. 11

| | Average Particle Diameter of Activated Carbon (μm) | 25°C | | -30°C | |
|---|---|---|---|---|---|
| | | Capacitance (F/cm³) | Resistance (mΩ) | Capacitance (F/cm³) | Resistance (mΩ) |
| Example 4 | 2.1 | 17.0 | 20.3 | 16.7 | 58.0 |
| Example 5 | 2.7 | 17.3 | 16.3 | 17.1 | 57.2 |
| Example 6 | 3.9 | 17.0 | 17.0 | 15.0 | 72.9 |
| Example 7 | 4.6 | 16.7 | 18.0 | 12.6 | 90.5 |
| Example 8 | 8.0 | 15.9 | 22.0 | 4.8 | 280.0 |

ELECTRIC DOUBLE LAYER CAPACITOR

RELATED APPLICATIONS

This application is the U.S. National Phase under 35 U.S.C. §371 of International Application No. PCT/JP2006/315573, filed on Aug. 7, 2006, which in turn claims the benefit of Japanese Application No. 2005-245608, filed on Aug. 26, 2005 and Japanese Application No. JP 2006-033373, filed on Feb. 10, 2006, the disclosures of which Applications are incorporated by reference herein.

TECHNICAL FIELD

The present invention relates to an electric double layer capacitor used for various electronic devices.

BACKGROUND ART

An electric double layer capacitor includes a capacitor element having a polarizable electrode as a positive electrode, another polarizable electrode as a negative electrode, and a separator provided between these electrodes. The polarizable electrodes face each other across the separator. The capacitor element is impregnated with a driving electrolyte.

A polarizable electrode generally contains activated carbon. The surface of the activated carbon has a functional group, such as a carboxyl group, a phenolic hydroxyl group, a carbonyl group, or a quinone group, provided thereon. These surface functional groups influence the characteristics of the capacitor. An electric double layer capacitor including polarized electrode layers containing activated carbon with abundant acidic surface functional groups (carboxyl group, carbonyl group, phenolic hydroxyl group, lactone group) has a large site contributing to the capacitance of the capacitor, accordingly having a large pseudocapacitance.

A conventional electric double layer capacitor disclosed in Japanese Patent Laid-Open Publication No. 2000-169129 has the total amount of at least one surface functional group selected from a carboxyl group, a quinone group, a hydroxyl group, and a lactone group ranging from 0.2 mEq to 1.00 mEq per 1 gram of activated carbon, thereby having a large capacitance. This capacitor includes, as a driving electrolyte, a solution containing an aprotic polar solvent, such as propylene carbonate, and a quaternary ammonium salt dissolving in the solvent.

An electric double layer capacitor disclosed in Japanese Patent Laid-Open Publication Nos. 11-54376 and 11-54379 includes, as a driving electrolyte, a solution containing an aprotic polar solvent, such as propylene carbonate, and an amidine salt dissolving in the solvent. This solution provides a capacitance larger than that of a capacitor employing quaternary ammonium salt. However, these documents do not address characteristics at low temperatures, while they address characteristics at a room temperature.

A conventional electric double layer capacitor including a driving electrolyte containing an aprotic polar solvent, such as propylene carbonate, and an amidine salt dissolving in the solvent, and a polarizable electrode layer containing an activated carbon having a sufficient amount of acidic surface functional groups has a large pseudocapacitance. However, the driving electrolyte electrochemically reacts with the acidic surface functional groups on the surface of the polarizable electrode layer during a charge and discharge reliability test, thereby producing a large amount of reactant. This reactant blocks the site of the activated carbon contributing to the capacitance, hence reducing the capacitance and deteriorating the characteristics, e.g. increasing its resistance. This deterioration prominently appears particularly at low temperatures.

SUMMARY OF THE INVENTION

An electric double layer capacitor includes a first collector, a first polarizable electrode layer provided on the first collector, a second collector, a second polarizable electrode layer provided on the second collector and facing the first polarizable electrode layer, a separator having an insulating property and provided between the first polarizable electrode layer and the second polarizable electrode layer, and a driving electrolyte impregnated in the first polarizable electrode layer and the second polarizable electrode layer. The polarizable electrode layers mainly contain activated carbon made from phenol resin, have a surface roughness not larger than 0.6 µm, and have an electrode density ranging from 0.5 g/cm$^3$ to 0.7 g/cm$^3$.

This electric double layer capacitor has characteristics deteriorating little even at low temperatures, thus having a reliability for a long time.

BRIEF DESCRIPTION OF DRAWINGS

FIG. 4 shows samples of an electric double layer capacitor according to Exemplary Embodiment 2 of the invention.

FIG. 5 shows a discharge capacitance and a DC resistance at a room temperature of the samples of the capacitor according to Embodiment 2.

FIG. 6 shows a discharge capacitance and a DC resistance at low temperatures of the samples of the capacitor according to Embodiment 2.

FIG. 11 shows the relationship between a capacitance density per volume and the resistance of the electric double layer capacitor according to Embodiment 4.

REFERENCE NUMERALS

1 Capacitor Element
2 Positive Electrode Lead Wire
3 Polarizable Electrode Element (First Polarizable Electrode Element)
3A Collector (First Collector)
3B Polarizable Electrode Layer (First Polarizable Electrode Layer)
4 Negative Electrode Lead Wire
5 Polarizable Electrode Element (Second Polarizable Electrode Element)
5A Collector (Second Collector)
5B Polarizable Electrode Layer (Second Polarizable Electrode Layer)
6 Separator
7 Sealing Member
8 Case
9 Driving Electrolyte

DETAILED DESCRIPTION OF THE PREFERRED EMBODIMENTS

Exemplary Embodiment 1

Figure 1:
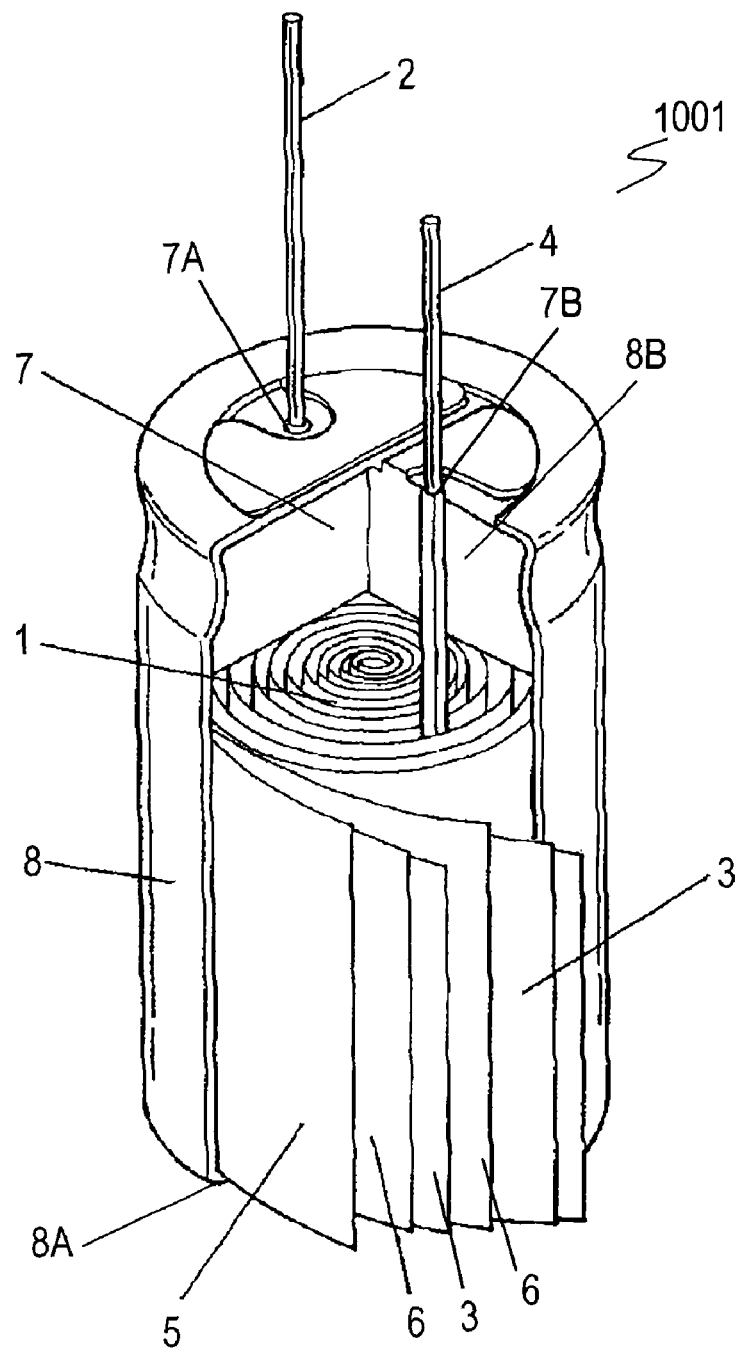
FIG. 1 is a partial cutaway perspective view of an electric double layer capacitor according to Exemplary Embodiment 1 of the present invention.

FIG. 1 is a partial cutaway perspective view of electric double layer capacitor 1001 according to Exemplary Embodiment 1 of the present invention. Capacitor 1001 includes case 8, capacitor element 1 accommodated in case 8, positive electrode lead wire 2 connected to capacitor element 1, and negative electrode lead wire 4 connected to capacitor element 1. Capacitor element 1 includes polarizable electrode element 3 having positive electrode lead wire 2 connected thereto, polarizable electrode element 5 having negative electrode lead wire 4 connected thereto, and separator 6 provided between polarizable electrode elements 3 and 5. Separator 6 is made of insulating material and prevents electrode elements 3 and 5 from short-circuiting. Electrode elements 3 and 5 and separator 6 are rolled together and accommodated in case 8.

Figure 2A:
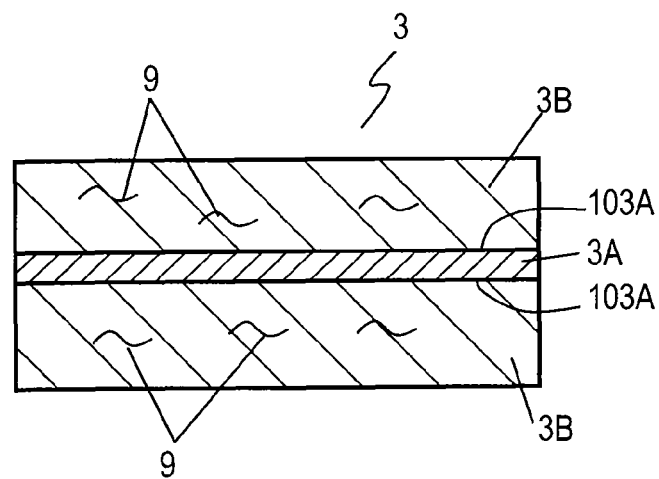
FIG. 2A is a sectional view of a polarizable electrode element of the electric double layer capacitor according to Embodiment 1.

FIG. 2A is a sectional view of polarizable electrode element 3. Element 3 includes collector 3A made of metal foil, such as aluminum foil, and polarizable electrode layer 3B provided on surface 103A of collector 3A. Surface 103A is processed with, for example, an electrolyte to be roughened. Polarizable electrode layer 3B is made mainly of activated carbon and has an acidic surface functional group adhering onto the surface of the activated carbon. The activated carbon is produced from phenol resin. Polarizable electrode layer 3B is impregnated with driving electrolyte 9. Driving electrolyte 9 employs a solution containing an aprotic polar solvent, such as propylene carbonate, and a quaternary ammonium salt dissolving in the solvent.

Figure 2B:
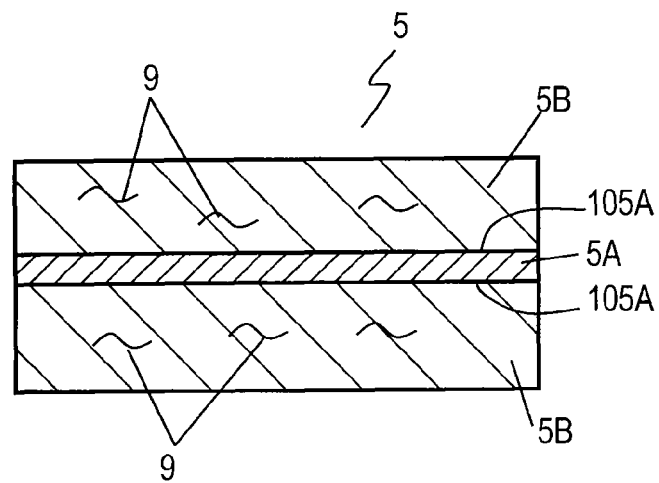
FIG. 2B is a sectional view of a polarizable electrode element of the electric double layer capacitor according to Embodiment 1.

FIG. 2B is a sectional view of polarizable electrode element 5. Element 5 includes collector 5A made of aluminum foil and polarizable electrode layer 5B provided on surface 105A of collector 5A. Surface 105A is processed with, for example, electrolyte 9 to be roughened. Polarizable electrode layer 5B contains activated carbon. The activated carbon has an acidic surface functional group attached onto the surface thereof, and is applied onto surface 105A. Layer 5B is impregnated with driving electrolyte 9 similarly to polarizable electrode layer 3B.

Sealing member 7 made of rubber has holes 7A and 7B therein having positive electrode lead wire 2 and negative electrode lead wire 4 inserted thereinto, respectively, and is fitted into the top end of case 8. Case 8 is made of metal, and has a cylindrical shape having bottom 8A and opening 8B. Opening 8B of case 8 undergoes a drawing process and a curling process so as to compress sealing member 7 to seal opening 8B of case 8.

Plural samples having different surface roughnesses and electrode densities of polarizable electrode layers 3B and 5B were produced. Polarizable electrode layers 3B and 5B of polarizable electrode elements 3 and 5 of these samples were pressed under various press working conditions so as to reduce the surface roughness of layers 3B and 5B and to increase the electrode density. Some samples of electric double layer capacitors were produced using the samples of polarizable electrode elements 3 and 5.

Figure 3A:
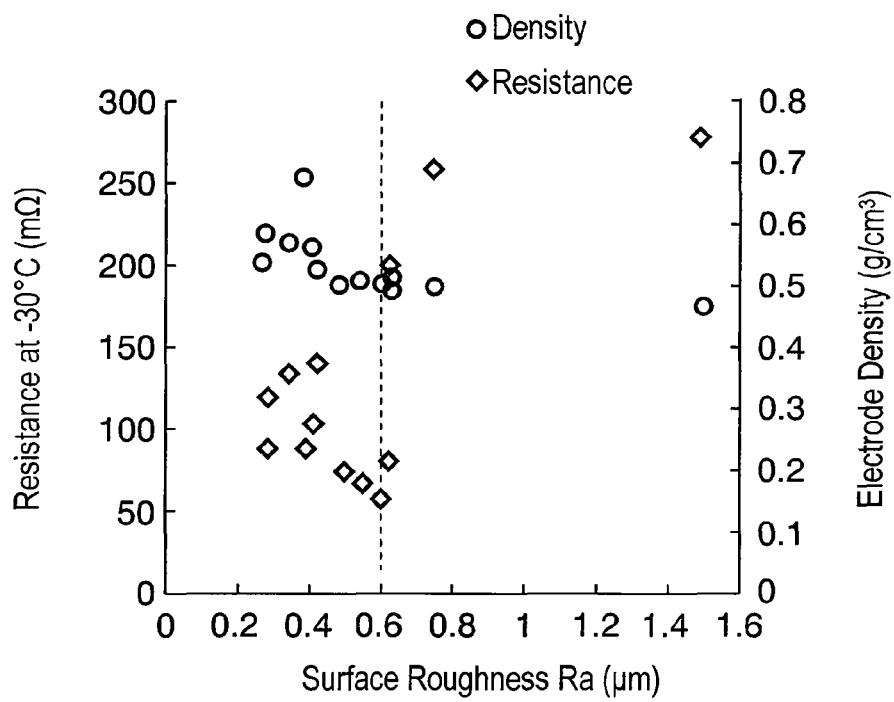
FIG. 3A shows the relationship among an electrode density, an initial direct-current (DC) resistance at −30° C., and the surface roughness of the polarizable electrode layer of the electric double layer capacitor according to Embodiment 1.
Figure 3B:
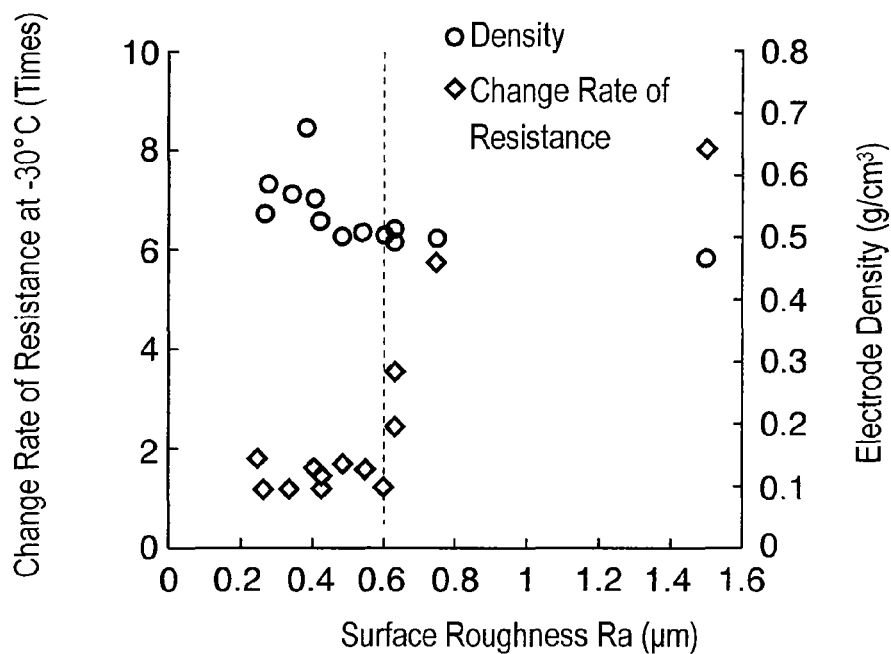
FIG. 3B shows the relationship among an electrode density, a change rate of the direct-current resistance relative to the initial DC resistance at −30° C., and the surface roughness of the polarizable electrode layer of the electric double layer capacitor according to Embodiment 1.

FIG. 3A shows the relationship among a surface roughness Ra (μm) of polarizable electrode layers 3B and 5B, an electrode density (g/cm$^3$) of electrode layers 3B and 5B, and an initial direct-current (DC) resistance DCR1 of the capacitor at a low temperature (−30° C.). FIG. 3B shows a DC resistance DCR2 at a low temperature (−30° C.) measured after applying a voltage of 2.5 V to these samples at 60° C. for 1,000 hours, and a change rate E1 of DC resistance DCR2 to initial DC resistance DCR1. (E1=DCR2/DCR1)

As shown in FIGS. 3A and 3B, samples having surface roughness Ra not larger than 0.6 μm has small DC resistance DCR1 at the low temperature (−30° C.) less than 150 mΩ, and small change rate E1 to the initial DC resistance.

This result provides an estimation that samples of the capacitor having small surface roughness Ra and a large electrode density of electrode layers 3B and 5B exhibit small DC resistance DCR1 at the low temperature (−30° C.). Actually, however, samples having surface roughness Ra smaller than approximately 0.2 μm were not evaluated because of the strength of collectors 3A and 5A of polarizable electrode elements 3 and 5, and of the performance limitation of a press machine used for the experiment.

A capacitor which had the electrode density of polarizable electrode layer 3B of a capacitor ranging approximately from 0.5 g/cm$^3$ to 0.7 g/cm$^3$ and which had a surface roughness Ra not larger than 0.6 μm had excellent characteristics, i.e., small DC resistance DCR1 at the low temperature (−30° C.), small change rate E1 of the resistance to the initial DC resistance, as shown in FIGS. 3A and 3B.

Thus, the surface roughness Ra of polarizable electrode layers 3B and 5B is determined to be not larger than 0.6 μm, and the electrode density of layers 3B and 5B is determined to range from 0.5 g/cm$^3$ to 0.7 g/cm$^3$, thereby providing electric double layer capacitor 1001 with excellent low-temperature characteristics and high long-term reliability, that is, with a small DC resistance at a low temperature (−30° C.) and a small change rate of the DC resistance.

Exemplary Embodiment 2

In an electric double layer capacitor according to Exemplary Embodiment 2, the amount of acidic surface functional groups contained in polarizable electrode layers 3B and 5B of electric double layer capacitor 1001 according to Embodiment 1 shown in FIGS. 1, 2A, and 2B is changed. The capacitor according to Embodiment 2 will be described along the combination with various kind of the driving electrolyte. Components identical to those of Embodiment 1 are denoted by the same reference numerals, and their description will be omitted. Only the difference will be described below.

FIG. 4 shows samples of electric double layer capacitors according to Embodiment 2. The samples were produced through reducing and changing the amount of acidic surface functional groups (carboxyl group, carbonyl group, phenolic hydroxyl group, lactone group) contained in polarizable electrode layers 3B and 5B by setting a heat-treatment temperature for producing the activated carbon to be not lower than 800° C. and by combining several types of driving electrolytes. These samples of the electric double layer capacitors include Examples 1 to 3 according to Embodiment 2 and Comparative Examples 1 to 7. These samples have a rated voltage of 2.0 V, a capacitance of 68 F, and a size of 18 mm in diameter by 50 mm in length. The amount of acidic surface functional groups was measured by back titration.

In Comparative Examples 1 to 5, electrode layers 3B and 5B were impregnated with an electrolyte containing quaternary ammonium salt. In Comparative Examples 6 and 7 and Examples 1 to 3 were impregnated with an electrolyte containing amidine salt.

These samples of electric double layer capacitors were aged by applying a voltage of 2.0 V at 60° C. for 12 hours. After that, the samples were charged by a constant current of 1.5 A at a constant voltage of 2.0 V, and then, were measured in an initial capacitance (an initial discharge capacitance) and an initial DC resistance while discharging at a current of 1.0 A after the charging. After a voltage of 2.3 V was applied to these samples at 60° C. for 1,000 hours continuously, the samples were measured in a capacitance and a DC resistance. FIG. 5 shows the discharge capacitance and DC resistances at a room temperature (25° C.). FIG. 6 shows the discharge capacitance and DC resistances at the low temperature (−30° C.).

As shown in FIGS. 5 and 6, Comparative Examples 1 to 5 had smaller capacitances and larger DC resistances than Comparative Examples 6 and 7 and Examples 1 to 3.

As shown in FIG. 5, Comparative Example 7 exhibited a large initial capacitance and a small initial DC resistance at the room temperature, while exhibiting a smaller capacitance and a larger DC resistance than Examples 1 and 2 after 1,000 hours of the reliability test. As shown in FIG. 6, this sample is inferior to Examples 1 and 2 in the initial characteristic and the characteristics after 1,000 hours of the reliability test.

As shown in FIGS. 5 and 6, Comparative Example 6 had a small initial capacitance at both the room temperature and the low temperature due to an excessively small amount of the acidic surface functional groups.

As shown in FIG. 5, Examples 1 and 2 had maximum initial capacitances similar to those of Example 3 and Comparative Example 7, and had large capacitances after 1,000 hours of the reliability test. At the low temperature, similarly, Examples 1 and 2 had the largest initial capacitance and a large capacitance after 1,000 hours.

According to the above result, it was confirmed that Example 3 and Comparative Example 7 had large initial capacitances, however, had large DC resistances and a large change rate of the capacitance and the resistance to their initial values, thus lacking long-term reliability. Comparative Example 6 had a small change rate of the capacitance and resistance to their initial values, thus having excellent long-term reliability, however, had a small initial capacitance. Meanwhile, Examples 1 and 2 do not have the above-described problems to Example 3 and Comparative Example 6 and 7, thus having a long-term reliability and having a maximum capacitance.

Thus, in the electric double layer capacitor including driving electrolyte 9 containing an aprotic polar solvent, such as propylene carbonate, and an amidine salt dissolving in the solvent, the activated carbon forming the polarizable electrode elements is made of phenol resin. The amount of the acidic surface functional groups of the activated carbon made of polarizable electrode layers 3B and 5B ranges preferably from 0.31 mEq to 0.37 mEq per 1 gram of the activated carbon.

This amount suppresses an electrochemical reaction between driving electrolyte 9 and the acidic surface functional groups on the surface of the polarizable electrode element. Further, the potential of the acidic surface functional groups in driving electrolyte 9 containing the aprotic polar solvent of propylene carbonate and the amidine salt dissolving in the solvent shifts within an optimum potential window of driving electrolyte 9, thereby raising a withstand voltage. These features eliminate gas generated due to the electrochemical reaction, prevents the resistance from increasing, and prevents the capacitance from changing, thereby providing an electric double layer capacitor with low characteristic degradation, excellent low-temperature characteristics, and a high long-term reliability.

Exemplary Embodiment 3

In an electric double layer capacitor according to Exemplary Embodiment 3, the activated carbon made from phenol resin for forming polarizable electrode layers 3B and 5B of the electric double layer capacitor according to Embodiment 2 is modified. In the capacitor according to Embodiment 3, components identical to those of Embodiment 2 are denoted by the same reference numerals, and their description will be omitted. Only difference will be described below.

According to Embodiment 3, the capacitance density per volume of the activated carbon made of phenol resin is maintained as large as possible. Increasing the specific surface area of the activated carbon enables the capacitance per volume of the activated carbon to proportionally increase, however, simultaneously, the volume of fine pores of the activated carbon increases, accordingly reducing the capacitance per volume of the activated carbon. For this reason, the capacitance of the electric double layer capacitor largely depends on the distribution of the fine pores.

The volume of the fine pores is designed to reduce unnecessary fine pores which do not contribute to the capacitance, accordingly obtaining the capacitance efficiently. The volume of the fine pores of the activated carbon is not larger than 1.1 cm$^3$/g, and the specific surface area is not smaller than 2,000 m$^2$/g. This arrangement provides the maximum capacitance density per volume of the activated carbon made from phenol resin.

During the above-described 1,000-hour charge/discharge reliability test, driving electrolyte 9 electrochemically reacts with the acidic surface functional groups on the surface of the polarizable electrode to generate a deteriorated substance. This substance blocks capacitance sites of the activated carbon, and accordingly, decreases the capacitance and increases the resistance, thereby deteriorating the characteristics. The electric double layer capacitor according to Embodiment 3 reduces the influence of this deteriorated substance as much as possible.

Exemplary Embodiment 4

In an electric double layer capacitor according to Exemplary Embodiment 4, the activated carbon forming polarizable electrode layers 3B and 5B of the electric double layer capacitor according to Embodiment 2 is further modified. In the capacitor according to Embodiment 4, components identical to those of Embodiment 2 are denoted by the same reference numerals, and their description will be omitted. Only the difference will be described below.

Having an excessively large average particle diameter, the activated carbon facilitates the diffusion of electrolyte ions in the fine pores of the activated carbon of polarizable electrode layers 3B and 5B to increase its resistance, accordingly preventing the capacitance from being extracted in charging and discharging. Meanwhile, having an excessively small average particle diameter, the activated carbon increases the resistance due to the contact resistance among the particles of the activated carbon and the resistance at the interface between the particles of the activated carbon and the collector, accordingly preventing the capacitance from being extracted in charging and discharging.

Figure 7:
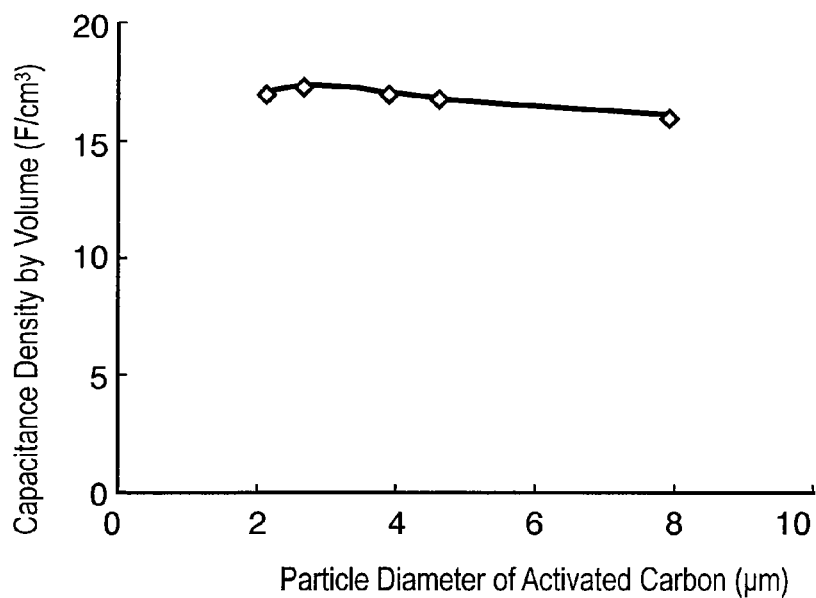
FIG. 7 shows the relationship between the average particle diameter and the capacitance density per volume of activated carbon at 25° C. of an electric double layer capacitor according to Exemplary Embodiment 4 of the invention.
Figure 8:
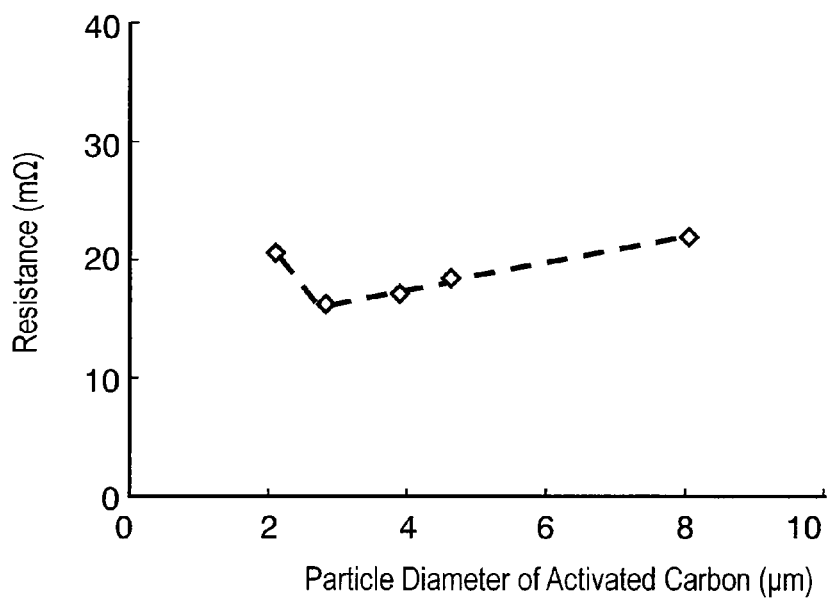
FIG. 8 shows the relationship between the average particle diameter and a DC resistance of activated carbon at 25° C. of the electric double layer capacitor according to Embodiment 4.
Figure 9:
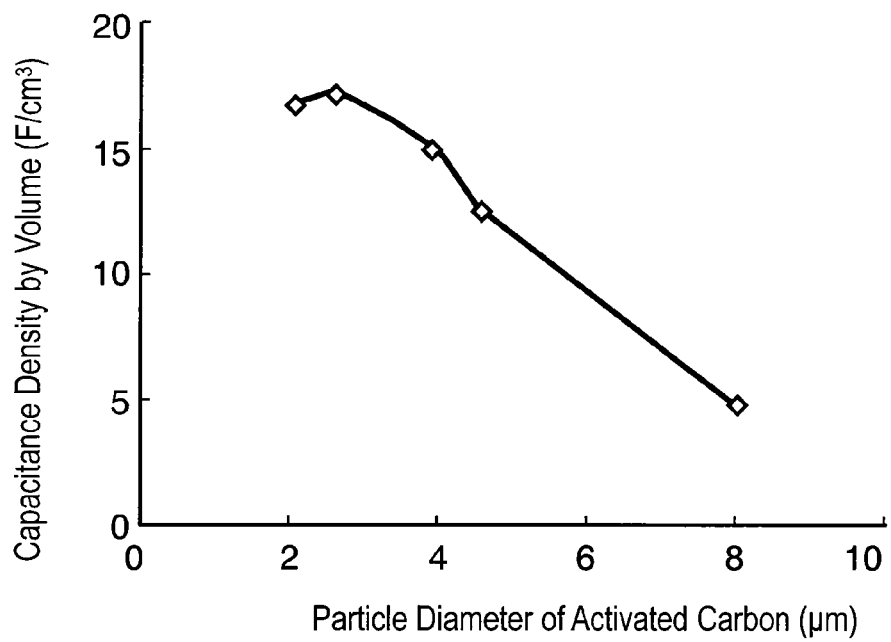
FIG. 9 shows the relationship between the average particle diameter and a capacitance density per volume of activated carbon at −30° C. of the electric double layer capacitor according to Embodiment 4.
Figure 10:
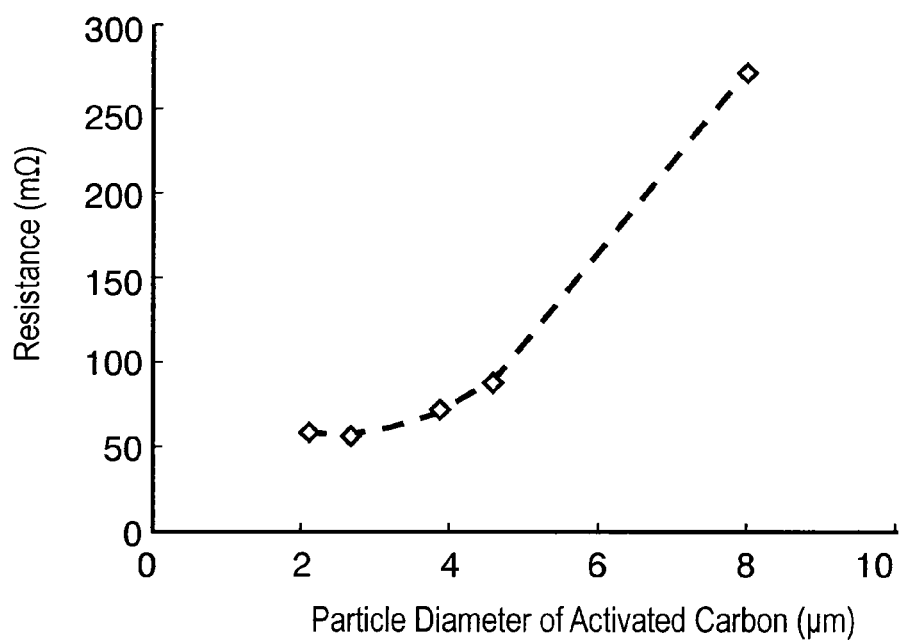
FIG. 10 shows the relationship between the average particle diameter and a DC resistance of activated carbon at −30° C. of the electric double layer capacitor according to Embodiment 4.

FIGS. 11 and 7 to 10 show the relationship between the capacitance density per volume and the resistance, by the average particle diameter of the activated carbon. FIG. 7 shows the relationship between the average particle diameter of activated carbon and the capacitance density per volume at a room temperature (25° C.). FIG. 8 shows the relationship between the average particle diameter of activated carbon and the resistance at a room temperature (25° C.). FIG. 9 shows the relationship between the average particle diameter of the activated carbon and the capacitance density per volume at a low temperature (−30° C.). FIG. 10 shows the relationship between the average particle diameter of the activated carbon and the resistance at a low temperature (−30° C.).

As shown in FIGS. 11 and 7 to 10, the average particle diameter of the activated carbon ranging from 2.5 μm to 3.51 μm maximize the capacitance density per volume of the activated carbon made from phenol resin, reduces the resistance of the electric double layer capacitor particularly at a low temperature.

Thus, the average particle diameter of the phenol resin activated carbon, a material of the polarizable electrode elements, ranging from 2.5 μm to 3.5 μm is suitable for the driving electrolyte containing an aprotic polar solvent, such as propylene carbonate, and an amidine salt dissolving in the solvent.

Figure 12:
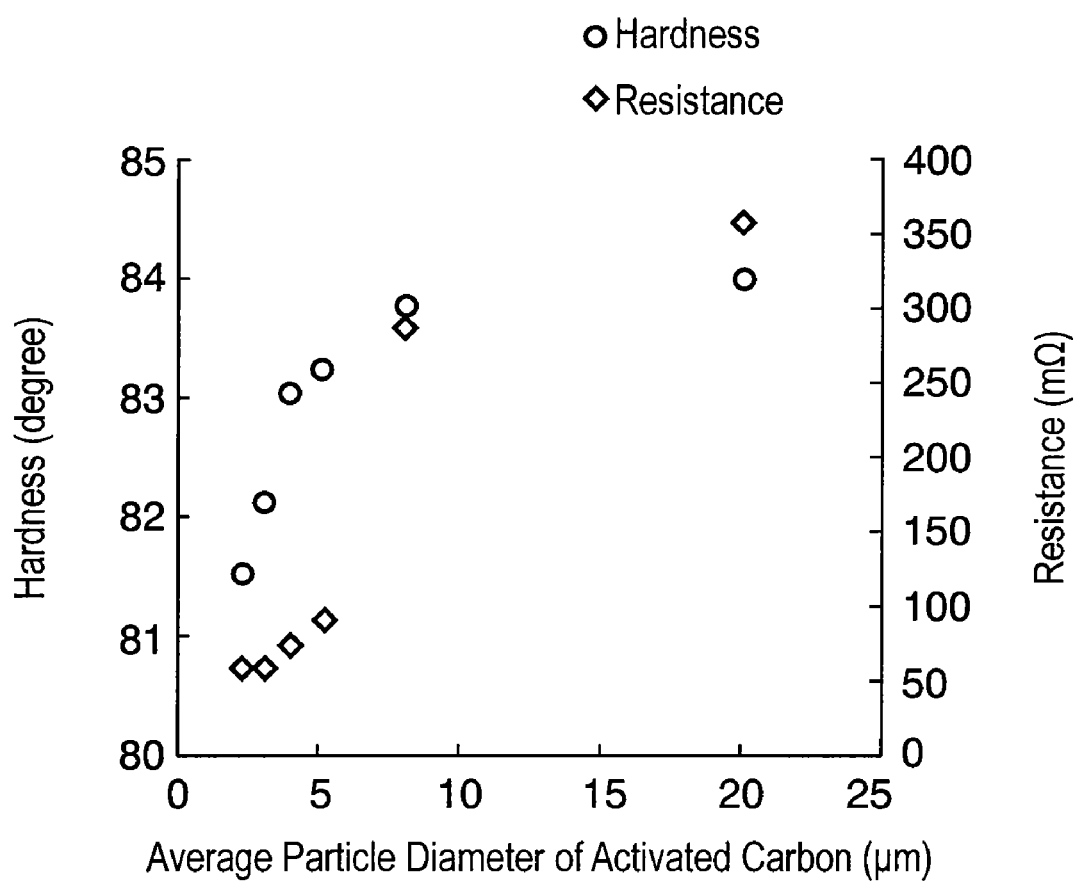
FIG. 12 shows the relationship among the average particle diameter, a hardness, and a DC resistance of activated carbon at −30° C. of the electric double layer capacitor according to Embodiment 4.

FIG. 12 shows the relationship between the hardness and the resistance at a low temperature (−30° C.), by the average particle diameter of the activated carbon. The phenol resin activated carbon having the average particle diameter within the above suitable range from 2.5 μm to 3.5 μm has a hardness ranging from 81 degrees to 83 degrees.

Exemplary Embodiment 5

An electric double layer capacitor according to Exemplary Embodiment 5 is partially different from the capacitor according to Embodiment 2 in the material of polarizable electrode layers 3B and 5B. In the capacitor according to Embodiment 5, components identical to those of Embodiment 2 are denoted by the same reference numerals, and their description will be omitted. Only the difference will be described below.

In the electric double layer capacitor according to Embodiment 5, polarizable electrode layers 3B and 5B contain not less than 8% by weight of conductive material, such as acetylene black, and 2% to 8% by weight, preferably 4% to 6% by weight of a binder. The binder has dispersibility, film-forming property, and water solubility. This composition reduces the contact resistance between polarizable electrode layers 3B and 5B and collectors 3A and 5A, and significantly improves characteristics, such as a capacitance and a resistance at a low temperature.

INDUSTRIAL APPLICABILITY

An electric double layer capacitor according to the present invention has characteristics deteriorating little even at low temperatures, and has a reliability for a long time, hence being useful for an electric double layer capacitor for use, such as a hybrid car, requiring a long operating life, a high power density, and excellent low-temperature characteristics.

The invention claimed is:
1. An electric double layer capacitor comprising:
   a first collector made of metal foil;
   a first polarizable electrode layer provided on the first collector, the first polarizable electrode layer mainly containing activated carbon made from phenol resin, the first polarizable electrode layer having a surface roughness not smaller than 0.5 μm and not larger than 0.6 μm, the first polarizable electrode layer having an electrode density ranging from 0.5 g/cm3 to 0.7 g/cm3;
   a second collector made of metal foil:
   a second polarizable electrode layer provided on the second collector and facing the first polarizable electrode layer, the second polarizable electrode layer mainly containing activated carbon made from phenol resin, the second polarizable electrode layer having a surface roughness not smaller than 0.5 μm and not larger than 0.6 μm, the second polarizable electrode layer having an electrode density ranging from 0.5 g/cm3 to 0.7 g/cm3;
   a separator provided between the first polarizable electrode layer and the second polarizable electrode layer, the separator having an insulating property; and
   a driving electrolyte impregnated in the first polarizable electrode layer and the second polarizable electrode layer.
2. The electric double layer capacitor of claim 1, wherein each of the first polarizable electrode layer and the second polarizable electrode layer further contains 0.31 mEq to 0.37 mEq of acidic surface functional groups per 1 gram of the activated carbon.
3. The electric double layer capacitor of claim 1, wherein the driving electrolyte contains an aprotic polar solvent of propylene carbonate and an amidine salt dissolved in the aprotic polar solvent.
4. The electric double layer capacitor of claim 1, wherein the activated carbon has not larger than 1.1 cm3/g of fine pores and has a specific surface area not smaller than 2,000 m2/g.
5. The electric double layer capacitor of claim 1, wherein the activated carbon has an average particle diameter ranging from 2.5 μm to 3.5 μm.
6. The electric double layer capacitor of claim 1, wherein the polarizable electrode layers further contain not larger than 8% by weight of conductive material and 2% to 8% by weight of binder.
7. The electric double layer capacitor of claim 6, wherein the conductive material comprises acetylene black.
8. The electric double layer capacitor of claim 6, wherein the binder has dispersibility, film-forming property, and water solubility.

* * * * *